(12) United States Patent
Katsuura et al.

(10) Patent No.: US 7,040,599 B2
(45) Date of Patent: May 9, 2006

(54) LIQUID SENDING AND RECEIVING JOINT DEVICE

(75) Inventors: Nobuo Katsuura, Kanagawa (JP); Toru Takahashi, Kanagawa (JP)

(73) Assignee: Nix, Inc., Yokohama (JP)

( * ) Notice: Subject to any disclaimer, the term of this patent is extended or adjusted under 35 U.S.C. 154(b) by 0 days.

(21) Appl. No.: 10/942,666

(22) Filed: Sep. 14, 2004

(65) Prior Publication Data

US 2006/0000512 A1     Jan. 5, 2006

(30) Foreign Application Priority Data

Jul. 5, 2004    (JP) .............................. 2004-197658

(51) Int. Cl.
*F16L 37/28* (2006.01)
(52) U.S. Cl. .............................. 251/149.6; 251/149.1; 251/366; 137/614.04
(58) Field of Classification Search ................ 137/614, 137/614.03, 614.04, 614.05; 251/149.1, 251/366, 149.6
See application file for complete search history.

(56) References Cited

U.S. PATENT DOCUMENTS 6,651,955 B1 * 11/2003 Anderson ................. 251/149.1

FOREIGN PATENT DOCUMENTS

| JP | 5-254138 | 10/1993 |
|---|---|---|
| JP | 7-68780 | 3/1995 |
| JP | 8-12301 | 1/1996 |
| JP | 8-50042 | 2/1996 |
| JP | 10-789 | 1/1998 |
| JP | 2000-289225 | 10/2000 |
| JP | 2001-524896 | 12/2001 |
| JP | 2003-266739 | 9/2003 |
| JP | 2003-528699 | 9/2003 |
| JP | 2003-308871 | 10/2003 |
| JP | 2003-317756 | 11/2003 |
| JP | 2003-331879 | 11/2003 |
| JP | 2004-006615 | 1/2004 |
| JP | 2004-064039 | 3/2004 |

* cited by examiner

*Primary Examiner*—Kevin Lee
(74) *Attorney, Agent, or Firm*—Hamre, Schumann, Mueller & Larson, P.C.

(57) ABSTRACT

The present invention provides a convenient and highly reliable joint device which contains a small number of components by simplifying the coupling structure, which is small-sized and can be manufactured at low cost, which is leak-proof under a wide range of conditions, regardless of the degree of internal pressure, and which does not contaminate the liquid inside the joint device. Concerning the liquid sending and receiving joint device of this invention for connecting a liquid reservoir 1, which contains the liquid, with a liquid acceptor 4 which receives the liquid from the liquid reservoir 1, an elastic member 3a or 3b having at least a hole 6 and a valve 11 with a flow path is provided at a joint part of either the liquid reservoir or the liquid acceptor, or both of them, wherein the valve 11 fits in or engages with the hole 6.

9 Claims, 13 Drawing Sheets

LIQUID SENDING AND RECEIVING JOINT DEVICE

BACKGROUND

The present invention relates to a liquid sending and receiving joint device which is included in a liquid supply devise of, for example, a fuel cell or an ink jet printer, and which conducts liquid from a liquid reservoir to a liquid acceptor that accepts the liquid.

Devices using a liquid supply devise capable of freely attaching or detaching a liquid reservoir, which contains a liquid and from which the liquid flows out, and a liquid acceptor, which receives the liquid from the liquid reservoir, are currently widely used, for example, in ink jet printers, in lighters which use liquid fuels, and for administrating liquid drugs in medical treatments. Regarding the liquid supply devise, it is possible to directly replace the liquid reservoir itself when it becomes short of the liquid to supply. Accordingly, as compared to a method of directly supplying the liquid to a reserve tank or the like which is mounted in the main device, it is possible to easily supply the liquid with a high level of safety without soiling a user's hands too much. Particularly, when the supplied liquid that can affect the human body or can greatly deteriorate when exposed to the outside air is used, the above-mentioned liquid supply devise is very effective.

Moreover, recently the development of fuel cells which generate electric power by using liquids as a fuel has been pursued. Many electronic manufacturers are actively engaged particularly in the development of direct methanol fuel cells (DMFC) which use methanol as fuel. The DMFC is expected as a new type fuel cell for the next generation, which is to be used, for example, in laptops, in various kinds of portable electronic equipment, and in cell phones. However, in general, methanol has severe consequences on the human body. Inhaling methanol will damage the central nervous system and cause dizziness and diarrhea. Inhaling a large amount of methanol or allowing methanol to come into contact with the eyes will damage the optic nerve resulting in a high possibility of blindness. Consequently, methanol is highly dangerous and toxic. Therefore, for DMFC as well, in order for general consumers to supply the liquid fuel easily and safely, the means of supplying methanol without directly handling it, using the liquid reservoir as a cartridge is believed to be most appropriate, and development is conducted extensively for this purpose (Japanese Patent Laid-Open (Kokai) Publications Nos. 2003-308871, HEI 8-12301, and 2003-317756).

The above-described liquid supply devise needs to have a detachable liquid sending and receiving joint device for conducting the liquid from the liquid reservoir to the liquid acceptor. Examples of conventional joint devices include: Japanese Patent Laid-Open (Kokai) Publication No. HEI 10-789, Japanese Patent Laid-Open (Kokai) Publication No. HEI 8-50042, Japanese Patent (Kohyo) Publication No. 2003-528699, Japanese Patent Laid-Open (Kokai) Publication No. 2003-266739, Japanese Patent (Kohyo) Publication No. 2001-524896, Japanese Patent Laid-Open (Kokai) Publication No. 2000-289225, Japanese Patent Laid-Open (Kokai) Publication No. HEI 7-68780, Japanese Patent Laid-Open (Kokai) Publication No. HEI 5-254138, and Japanese Patent Laid-Open (Kokai) Publication No. 2003-331879.

However, any of the above-mentioned joint devices include many components and thereby have complicated structures. Therefore, miniaturization and cost reduction have limitations. Moreover, since they are structured to open a valve or the like when the pressure inside the liquid reservoir and the liquid acceptor increases, their structures tend to easily leak liquids. Therefore, a joint device which has a simplified coupling structure, which does not cause liquids to leak even under high internal pressure, and which can be smoothly attached or detached, has been strongly desired. Particularly for the DMFC which is supposed to be applied to portable electronic equipment, it is believed to require a joint devise which can be downsized from a normal size of recent portable electronic equipment to at least 103 mm$^3$ or less. Moreover, in one of the above-cited examples, springs or the like are provided in flow paths where the liquid passes when the liquid reservoir engages with the liquid acceptor. While the joint devise is used, components such as metal ions from the springs elute into the liquid, thereby causing a problem of liquid contamination. In the case of the DMFC as well, the elution of metal ions is believed to affect the properties of the DMFC, such as deterioration of the catalysts, conductive materials, and electrolytes which are the constituent materials of the DMFC, as well as reducing the efficiency of the electrochemical reaction.

SUMMARY

The inventors of this invention devoted themselves to examining the problems of the respective conventional joint devices as described above in order to achieve a convenient and highly reliable joint device which has a simplified coupling structure, that includes a smaller number of components, which can be manufactured at low cost, which does not leak liquids under a wide range of conditions regardless of the degree of internal pressure, and which does not contaminate the liquid contained inside. As a result, they have found that the above-described problems can be solved as follows.

The present invention is a liquid sending and receiving joint device for connecting a liquid reservoir that contains a liquid, with a liquid acceptor that receives the liquid from the liquid reservoir; wherein an elastic member having at least a hole and a valve with a flow path is provided at a joint part of either the liquid reservoir or the liquid acceptor, or both of them, and the valve fits in or engages with the hole.

Regarding the liquid sending and receiving joint device of this invention, deformation of the elastic member can cause the valve to open or close, thereby forming a flow path.

Regarding the liquid sending and receiving joint device of this invention, the joint surface of the elastic member can have a curved and convex structure.

Regarding the liquid sending and receiving joint device of this invention, the contact surface of the elastic member in contact with the valve can have a curved and concave structure.

Regarding the liquid sending and receiving joint device of this invention, an urging element can be used to press the valve against the elastic member.

Regarding the liquid sending and receiving joint device of this invention, the valve can have a radial groove as the flow path for the liquid in a contact surface of the valve that is in contact with the elastic member.

Regarding the liquid sending and receiving joint device of this invention, a joint surface of the elastic member can have a labyrinth seal.

Regarding the liquid sending and receiving joint device of this invention, at the joint surfaces of the elastic member and the valve, either the elastic member or the valve, or both of them, can have a labyrinth seal.

The liquid acceptor can be a fuel cell which generates electric power by using liquids as fuel, and the liquid reservoir can be a liquid fuel cartridge.

Regarding the liquid sending and receiving joint device of this invention, a liquid containing at least methanol can be used as the fuel for the fuel cell.

Regarding the liquid sending and receiving joint device of this invention, a liquid flow rate at the flow path of the joint part can be set to 100 ml/hr.

Since the liquid sending and receiving joint device of this invention adopts the above-described structure, it has the following advantageous effects:

The liquid sending and receiving joint device of this invention has a coupling structure which is much simplified compared to conventional devices, and includes a reduced number of components. Therefore, it is possible to miniaturize the finished goods and to reduce the cost. Moreover, the size of the joint of this invention can be designed as desired according to the design of this invention. It is sufficiently possible to realize a size of 103 $mm^3$ or less. Merely by connecting the joint surface of the liquid reservoir to the liquid adaptor, the elastic member deforms and the valve opens to form the flow path, thereby making it possible to easily send the liquid from the liquid reservoir into the liquid acceptor. At the same time, as the pressure inside the liquid reservoir or the liquid acceptor increases, adhesion between the valve and the elastic member increases, thereby causing hardly any liquid leakage. Furthermore, by using the urging element to cause the valve to be pressed against the elastic member, it is possible to realize a highly reliable joint device in terms of liquid leakage even when used in a container under low pressure.

Moreover, it is possible to enhance the reliability of the opening of the valve by employing the curved and convex structure for the joint surface of the elastic member and by employing the curved and concave structure for the contact surface of the elastic member that is in contact with the valve.

The joint can also be used for a liquid fuel cartridge of a fuel cell which generates electric power by using a liquid as a fuel. The liquid sending and receiving joint device of this invention can control the flow rate of the liquid which is sent or received, by utilizing the design of the flow path of the valve. Accordingly, it is possible to limit the liquid flow rate to 100 ml/hr or less. Therefore, it is possible to gradually supply an appropriate amount of the liquid. When the joint devise is used for a fuel cell, it is possible to hold back an excessive supply of the liquid fuel. Particularly, when the joint devise is used for the DMFC which uses methanol as fuel, it is possible to prevent the crossover effect in which the fuel liquid flows into the electrolytes causing no reaction at the fuel electrode in the fuel cell. Therefore, the joint device of this invention is most appropriate as a joint device for the fuel cartridge of the fuel cell, particularly one that uses liquids as a fuel.

The liquid sending and receiving joint device of this invention can be attached to and used not only for the fuel cell as mentioned above, but also for an ink cartridge or a container for chemical liquid administration. It can be employed for a variety of uses as the joint device to send or receive the liquid from one container to another. It is believed that the liquid sending and receiving joint device of this invention is a particularly effective means as a small-sized joint device whose liquid flow rate is low.

DETAILED DESCRIPTION

An embodiment of the liquid sending and receiving joint device of this invention is described in detail below with reference to FIGS. 1 to 13. However, this invention is not limited to this embodiment. Moreover, regarding this embodiment, this invention is applied to both the liquid reservoir and the liquid acceptor. However, when this invention is actually used, it does not have to be always applied to both the liquid reservoir and the liquid acceptor. It can be applied solely to either of them.

Figure 1:
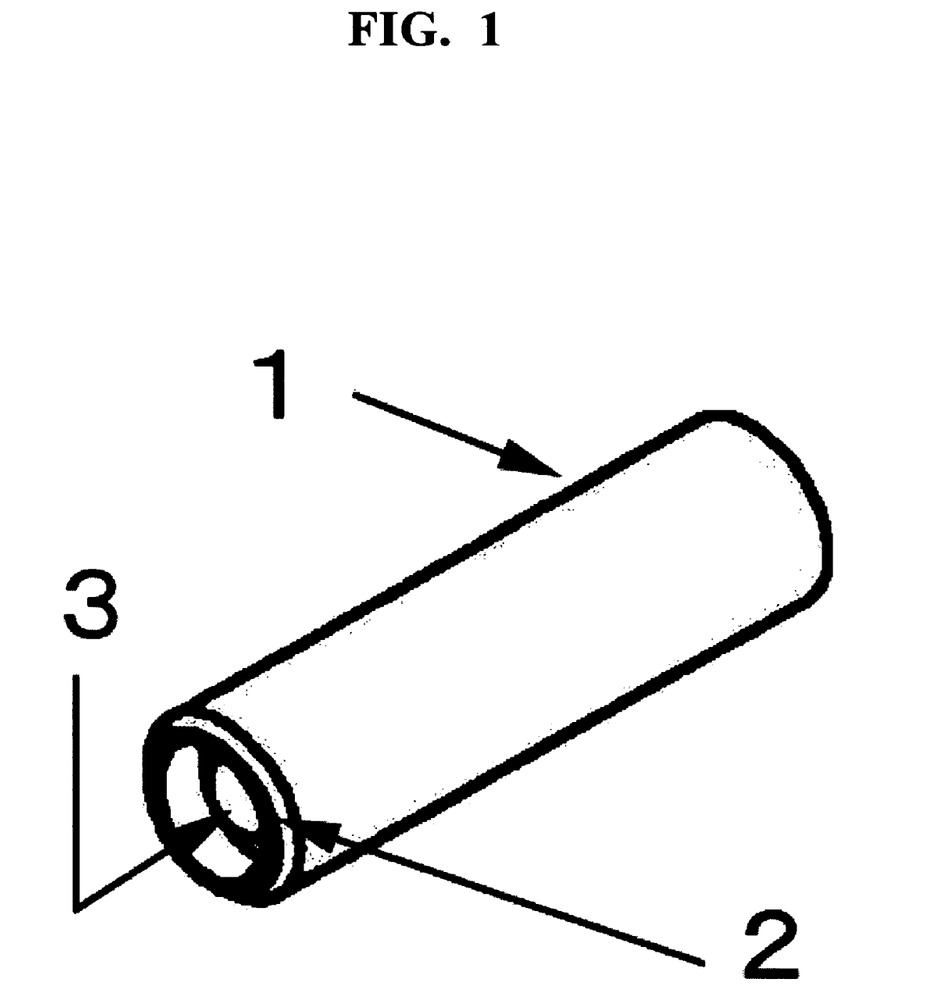
FIG. 1 is a perspective view of a liquid reservoir of the liquid sending and receiving joint device.
Figure 2:
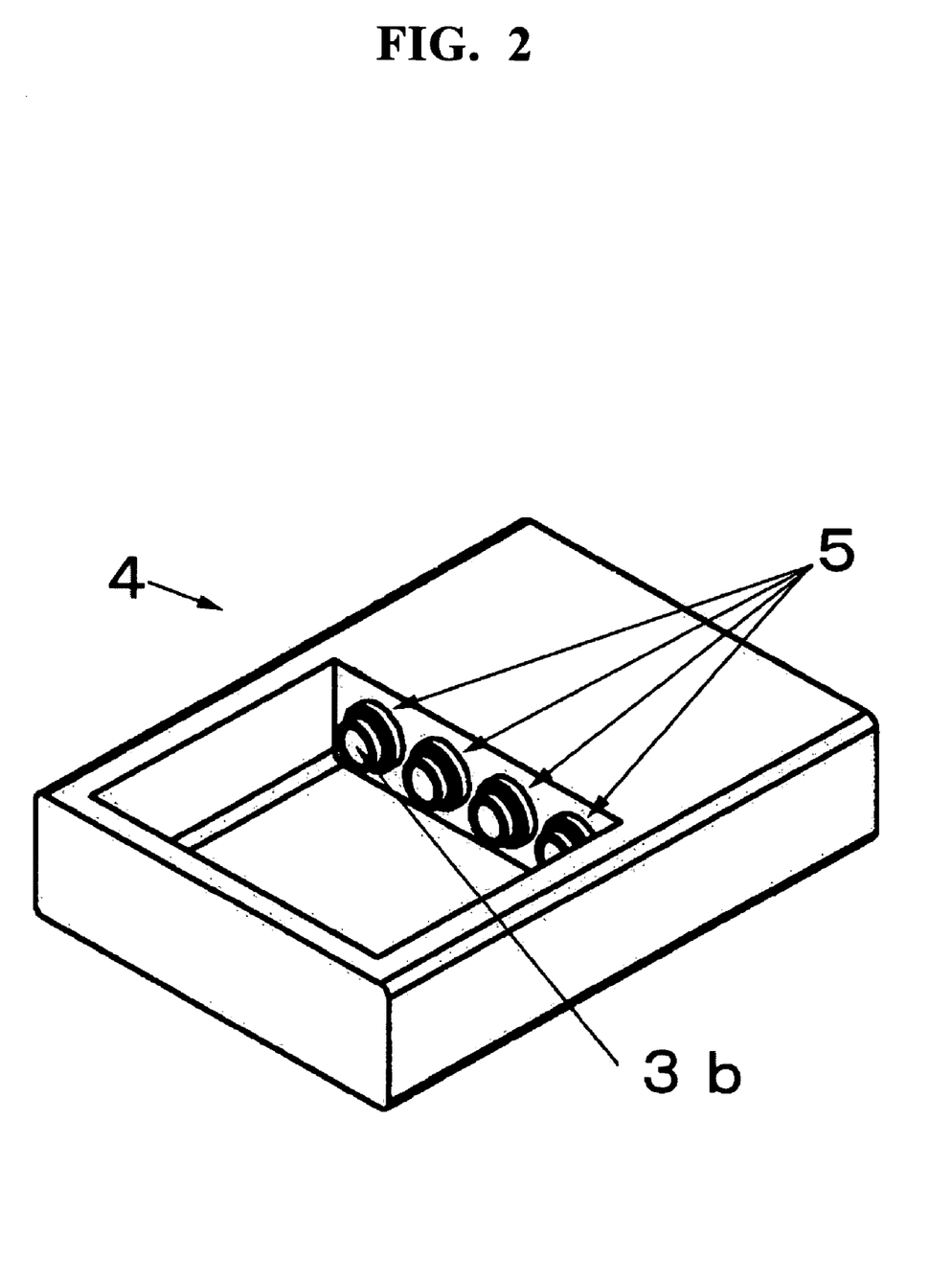
FIG. 2 is a perspective view of a liquid acceptor of the liquid sending and receiving joint device.
Figure 3:
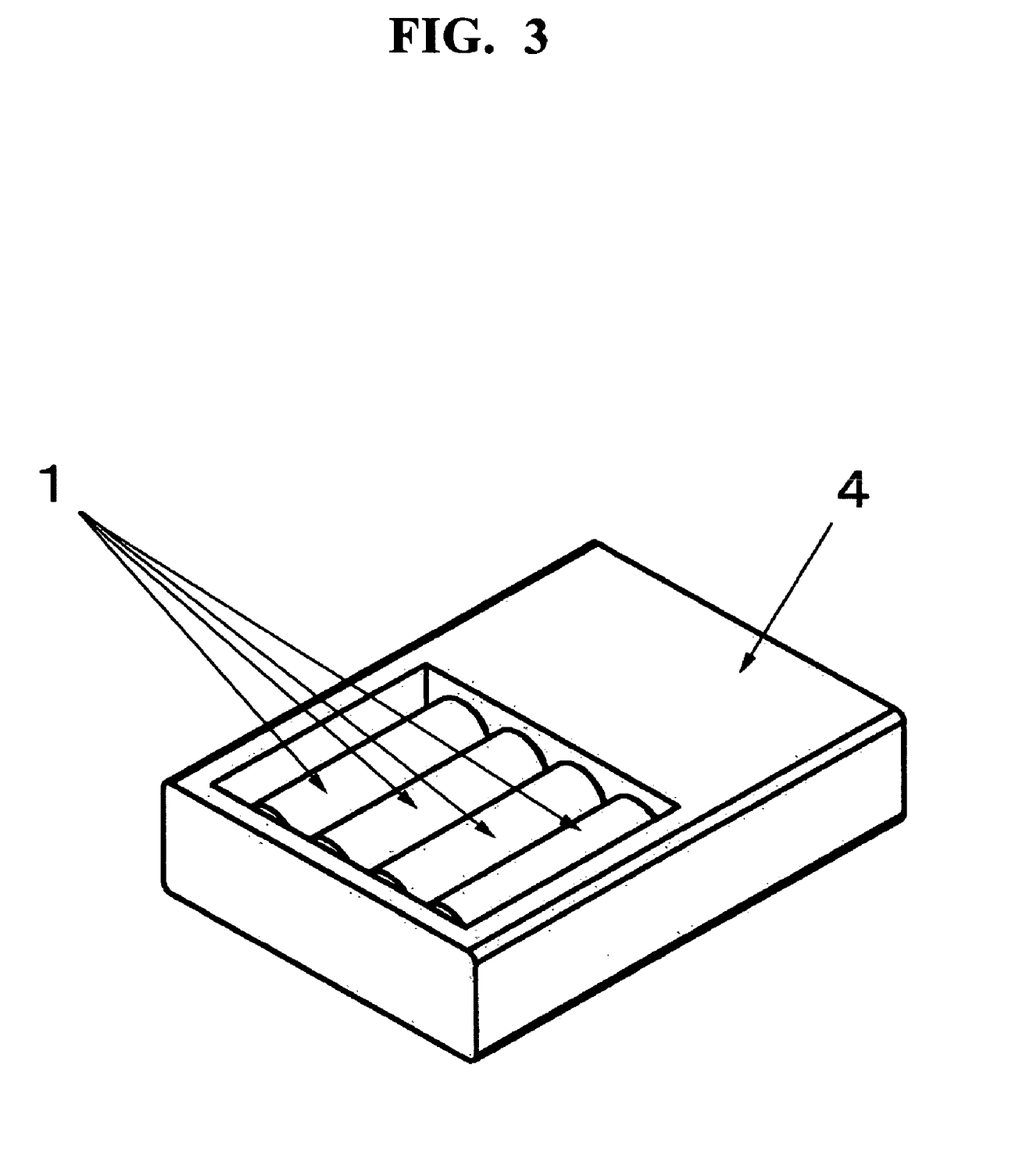
FIG. 3 is a perspective view of the liquid reservoir in the state where it is connected to the liquid acceptor.

FIG. 1 shows a liquid reservoir 1 of the liquid sending and receiving device according to an embodiment of this invention. FIG. 2 shows a liquid acceptor 4 according to the embodiment of this invention. FIG. 3 shows the state where the liquid reservoir 1 is connected to the liquid acceptor 4. The liquid reservoir 1 is a methanol fuel cartridge used for a DMFC and seals in a 3 wt/% aqueous methanol solution. The liquid acceptor 4 contains a main body of the DMFC (product number: 6061, made by Eifrig Inc.).

When the liquid in the liquid reservoir 1 is to be supplied to the liquid acceptor 4, they should be used in the state as shown in FIG. 3. The liquid reservoir 1 is previously filled with the liquid. In order to send the liquid from the liquid reservoir 1 to the liquid acceptor 4, a liquid-sending joint part 2 is provided for the liquid reservoir 1, and liquid-receiving joint parts 5 are provided for the liquid acceptor 4.

The shapes of the liquid reservoir 1 and the liquid acceptor 4 are not limited to those shown in FIGS. 1 to 3, and various shapes can be used. Regarding this embodiment, the drawings show that there are four liquid-receiving joint parts 5 of the liquid acceptor 4. However, the number of the liquid-receiving joint parts 5 and the number of the liquid reservoir 1 to be mounted can be increased or decreased according to the required amount of liquid supply depending on the application purpose.

Figure 4:
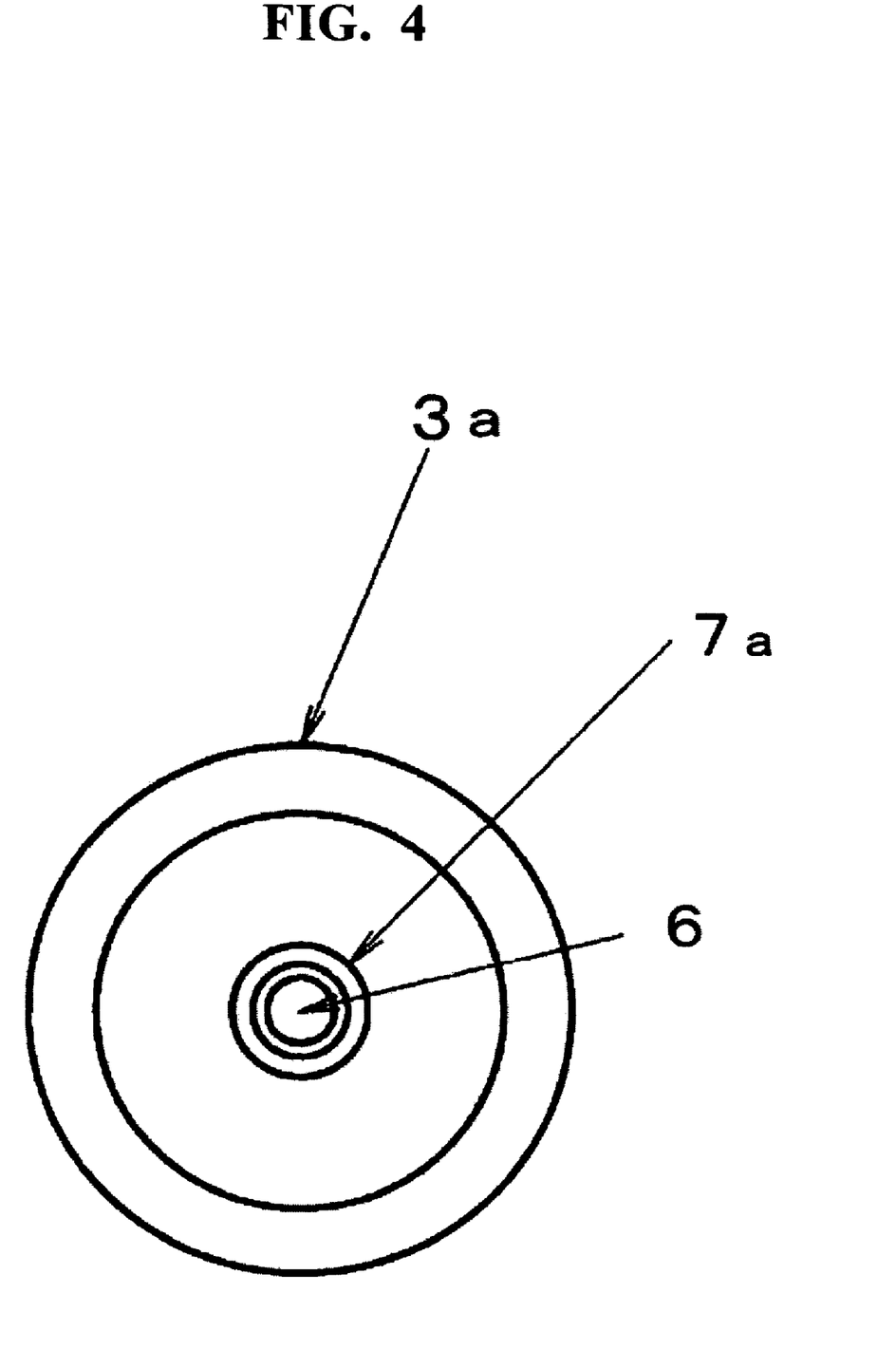
FIG. 4 is a front view of an elastic member of the joint device, which is used in the liquid reservoir or the liquid adaptor.
Figure 5:
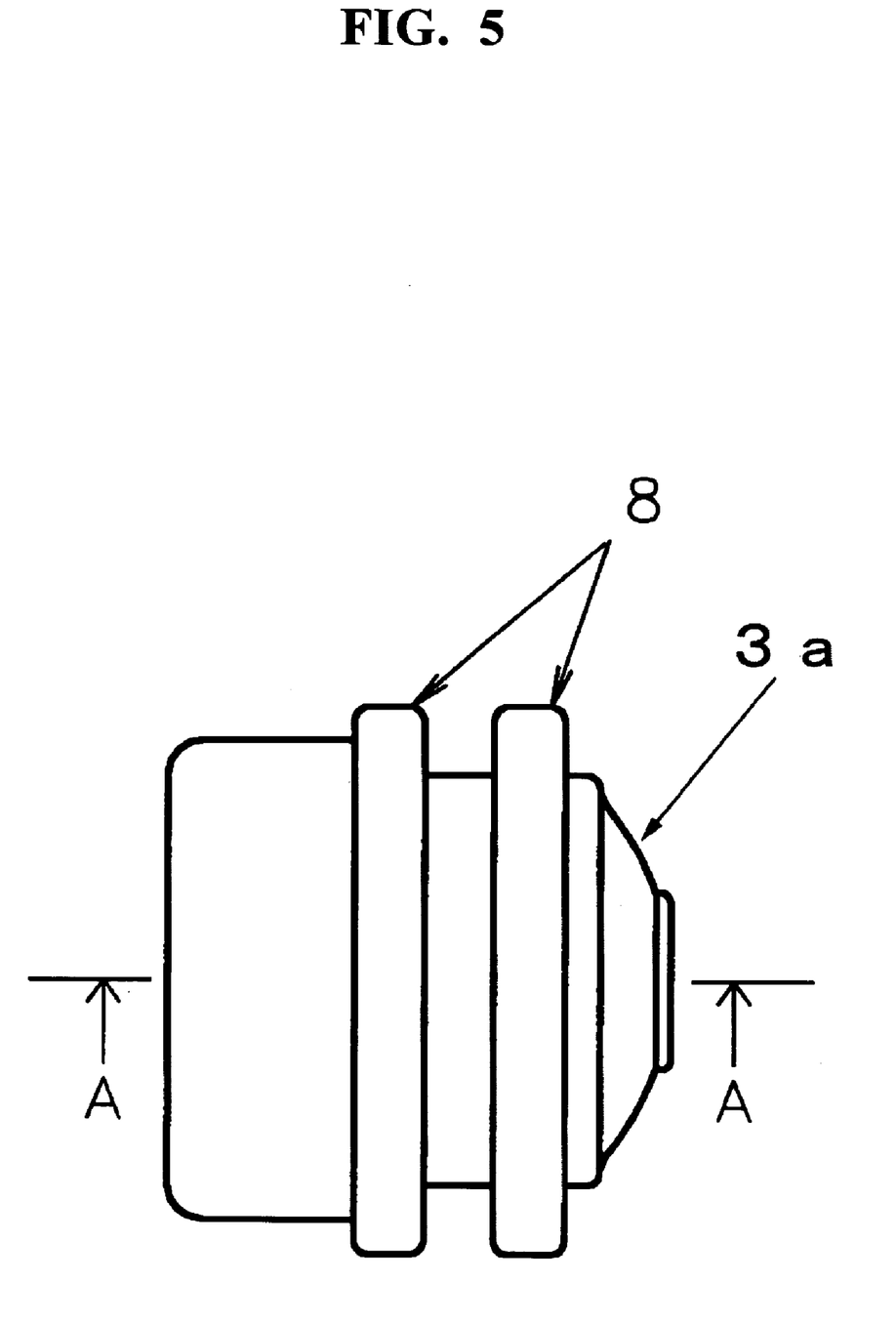
FIG. 5 is a side view of the elastic member of the joint device, which is used in the liquid reservoir or the liquid adaptor.
Figure 6:
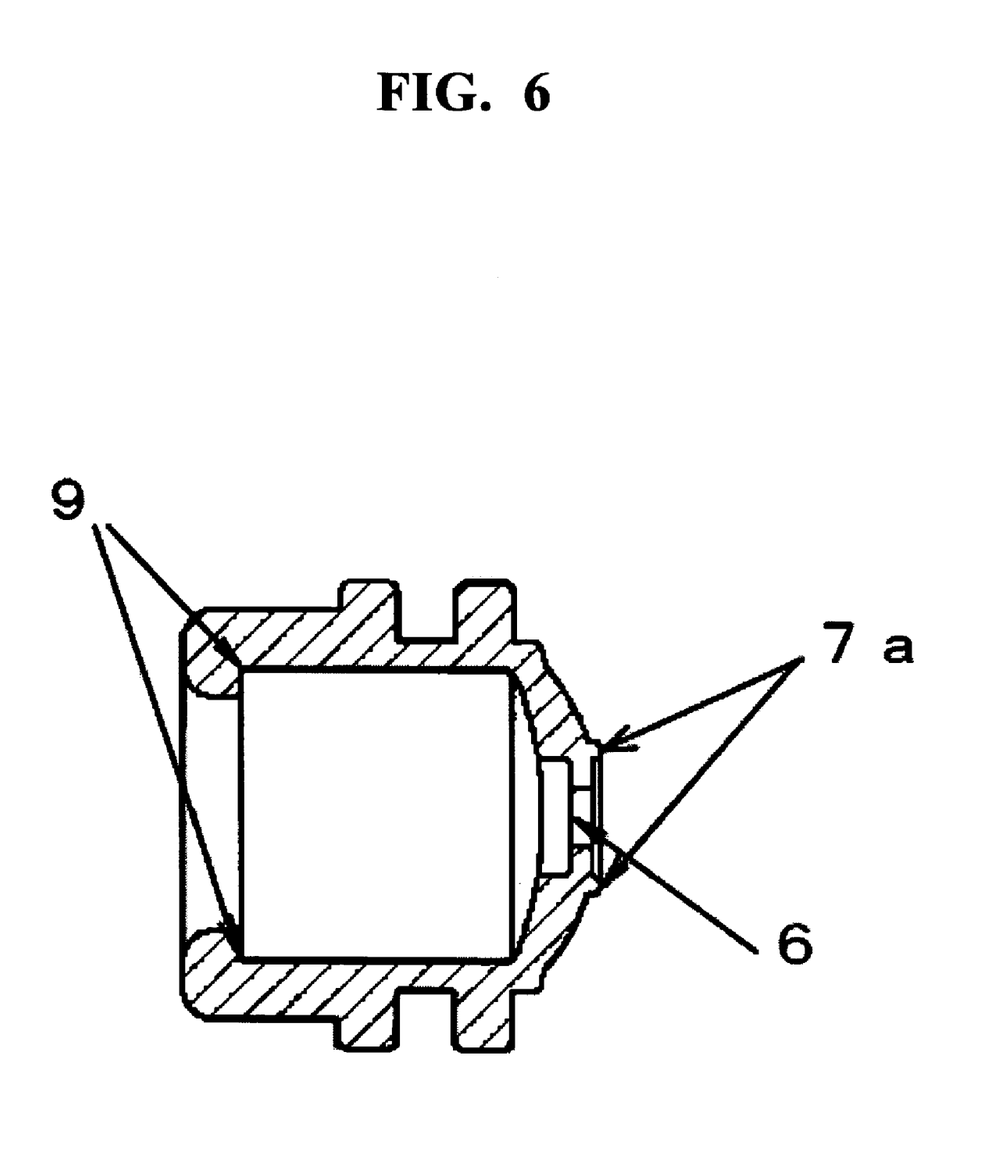
FIG. 6 is a sectional view of the elastic member of the joint device, which is used in the liquid reservoir or the liquid adaptor.
Figure 7:
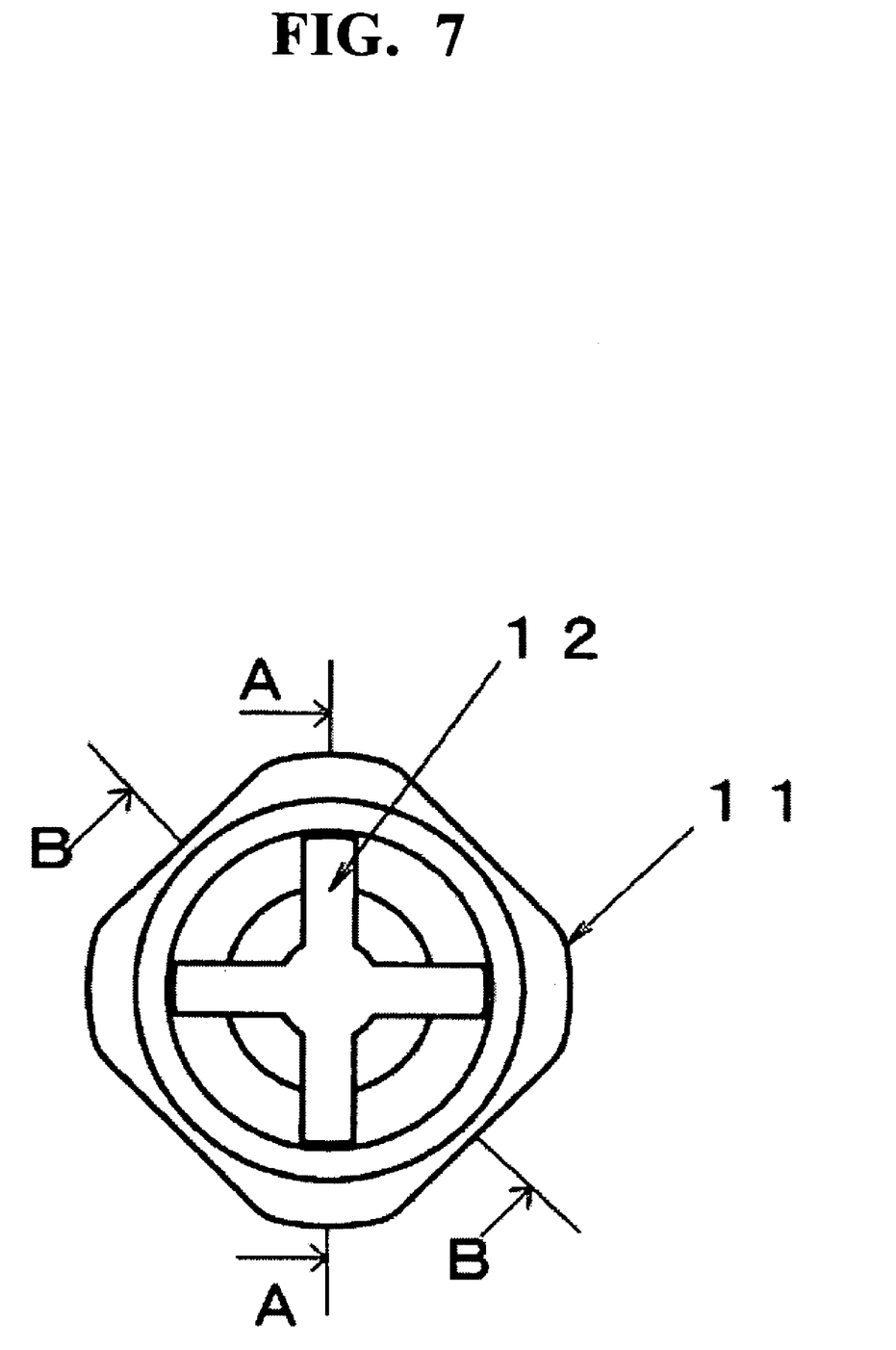
FIG. 7 is a front view of a valve.
Figure 8:
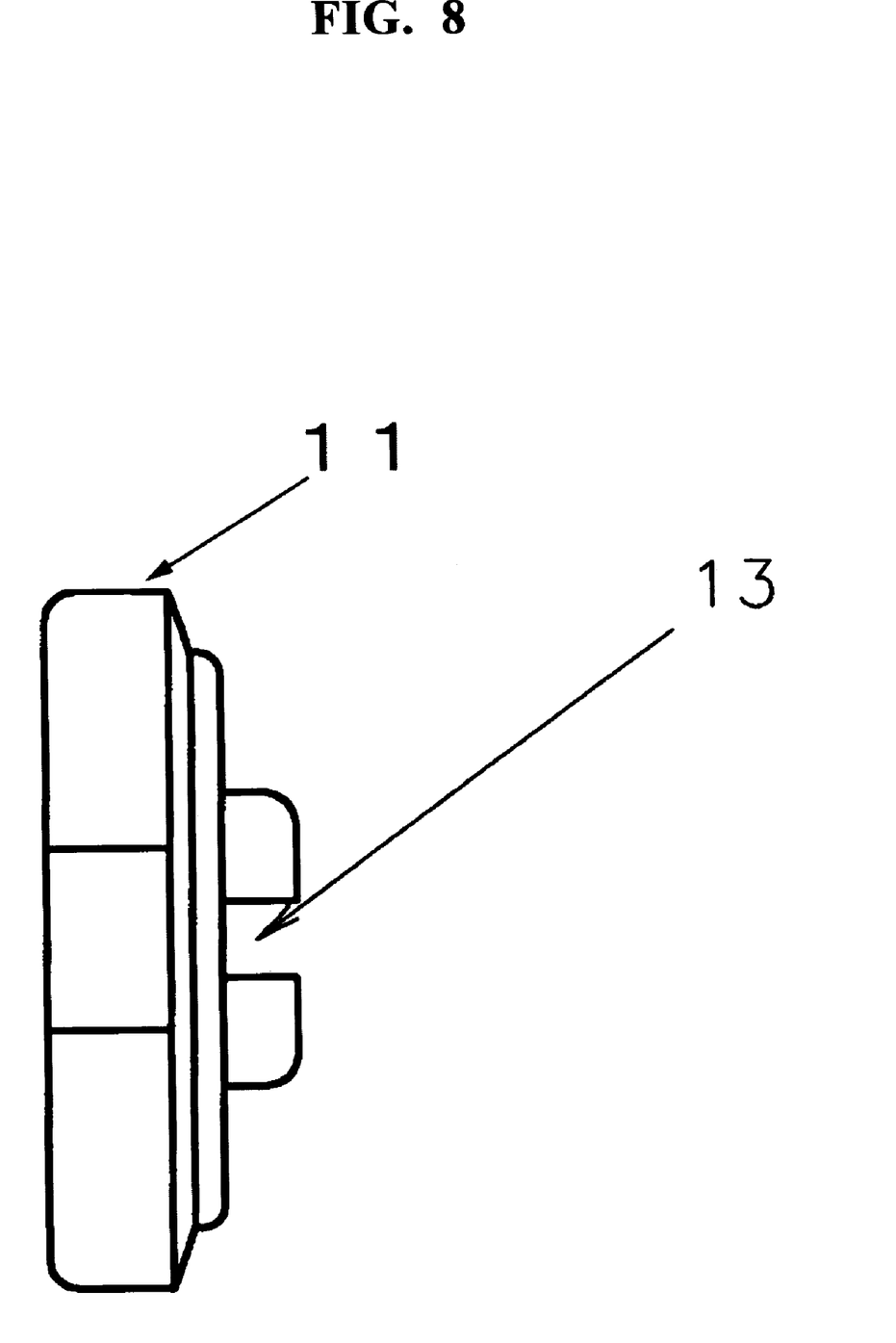
FIG. 8 is a side view of the valve.
Figure 9:
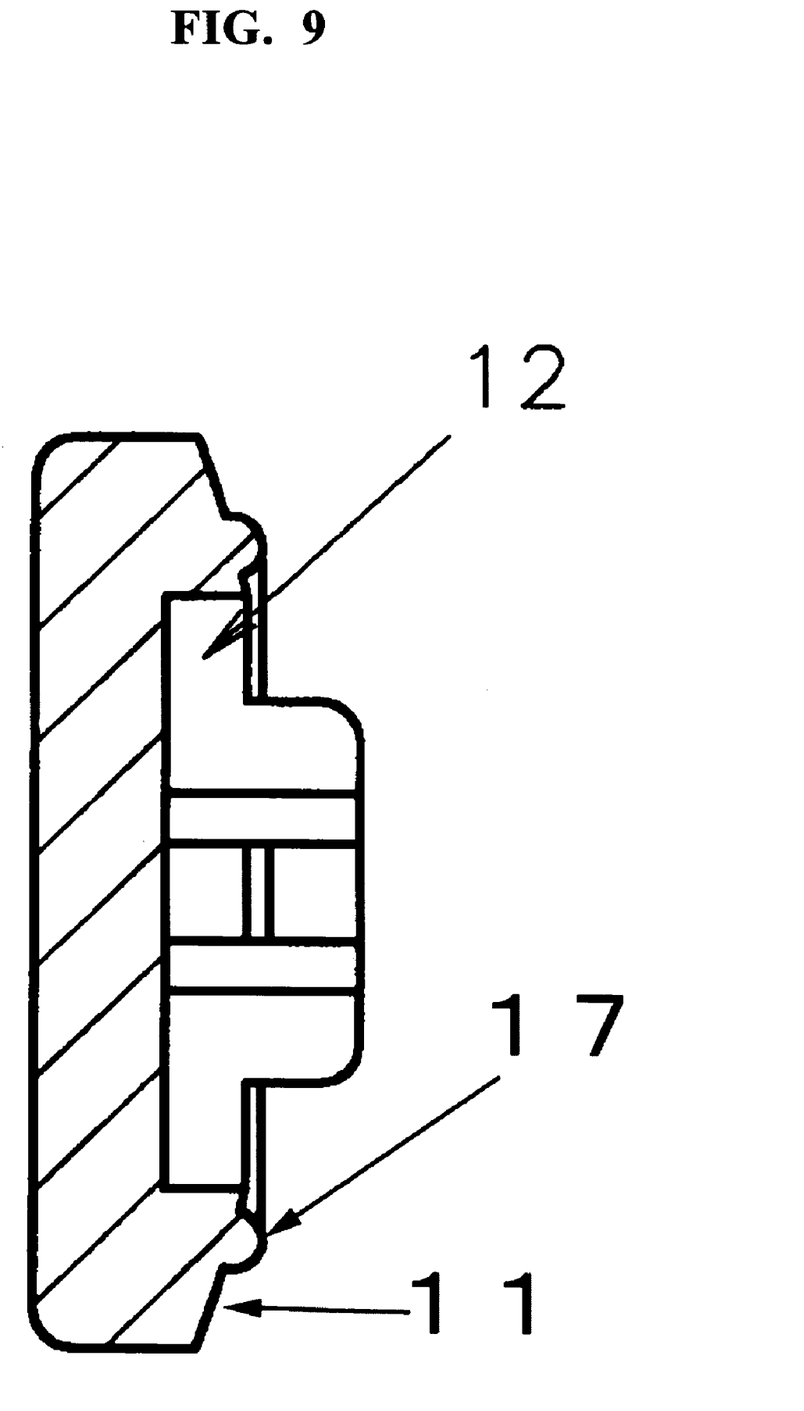
FIG. 9 is a sectional view of the valve along the line A—A of FIG. 7.
Figure 10:
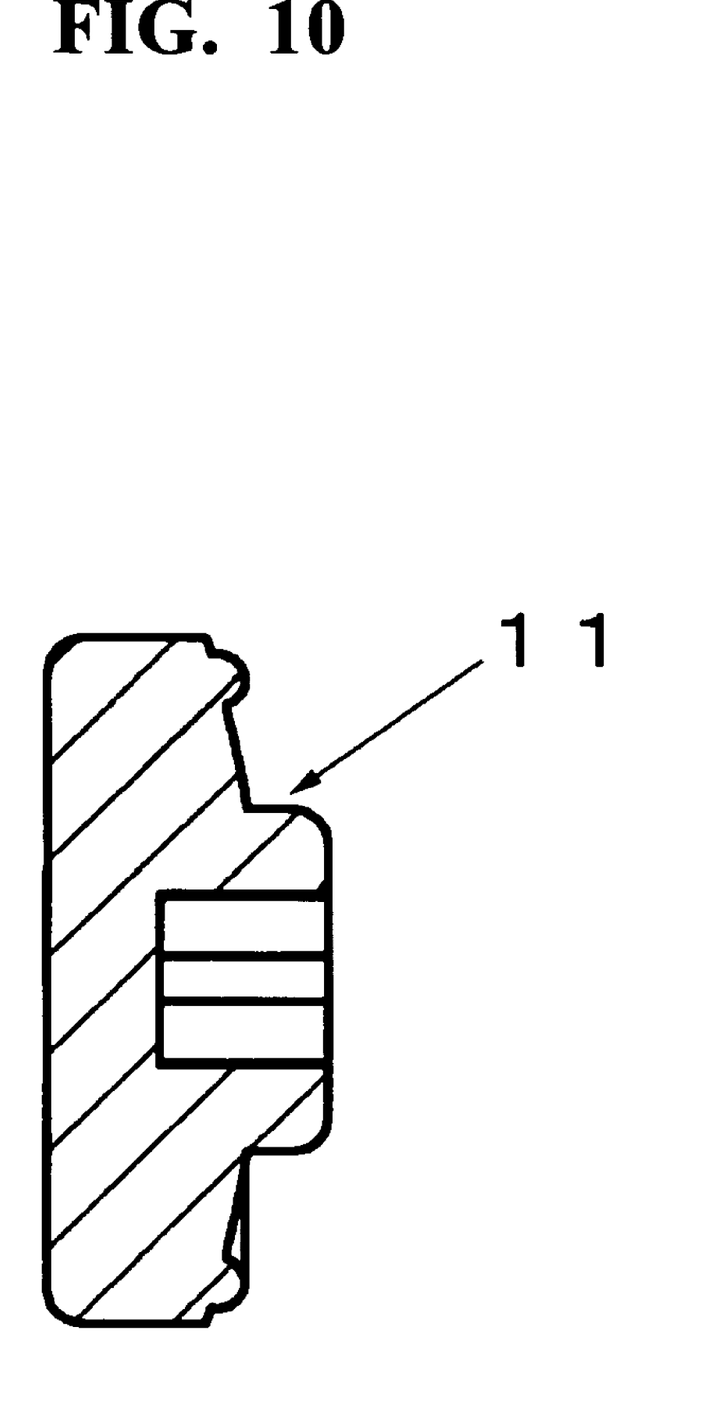
FIG. 10 is a sectional view of the valve along the line B—B of FIG. 7.
Figure 11:
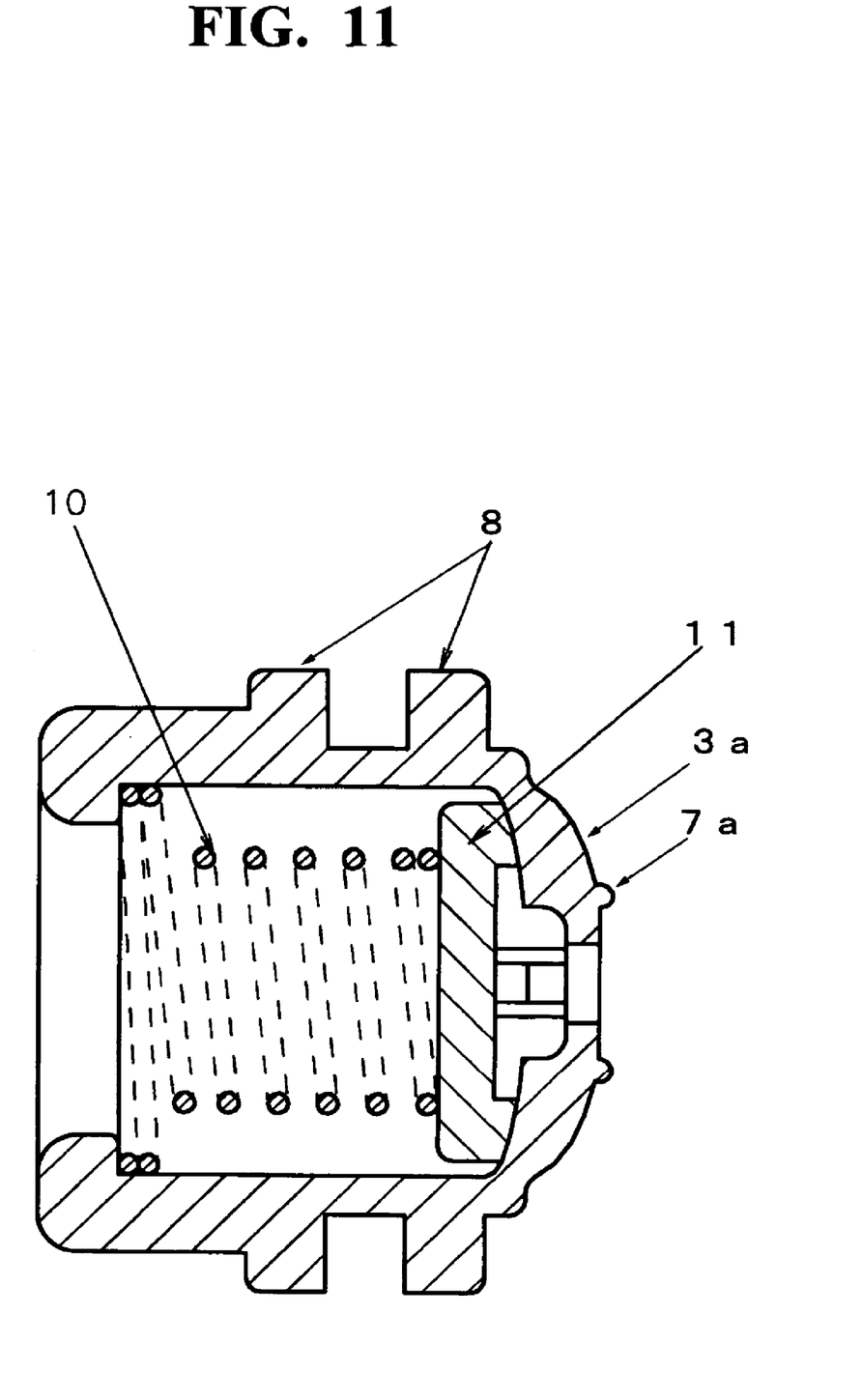
FIG. 11 shows the joint device in which the elastic member is combined with the valve.
Figure 12:
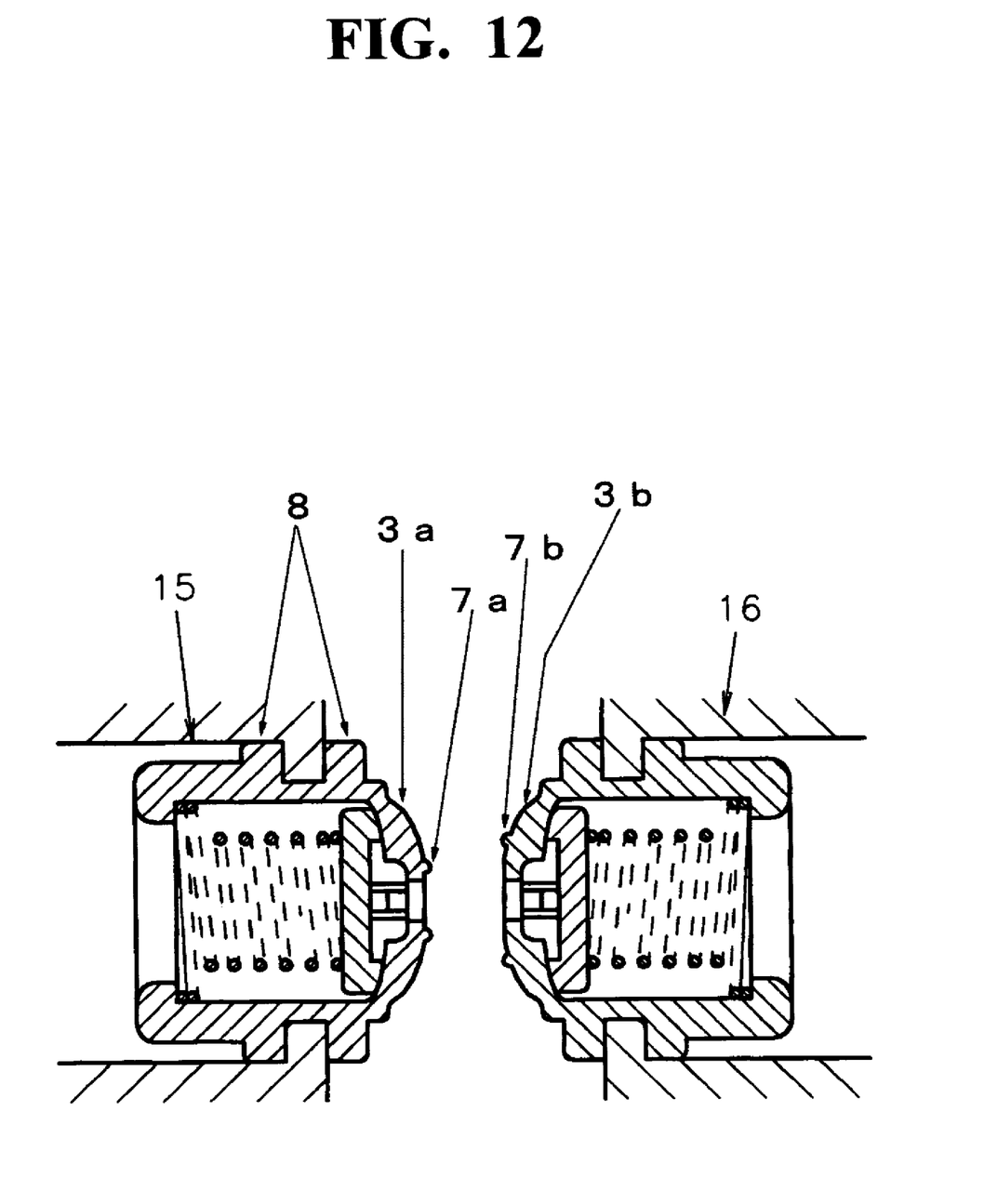
FIG. 12 illustrates the joint process (the process of joining two parts at the pre-joint stage (the step before joining two parts).
Figure 13:
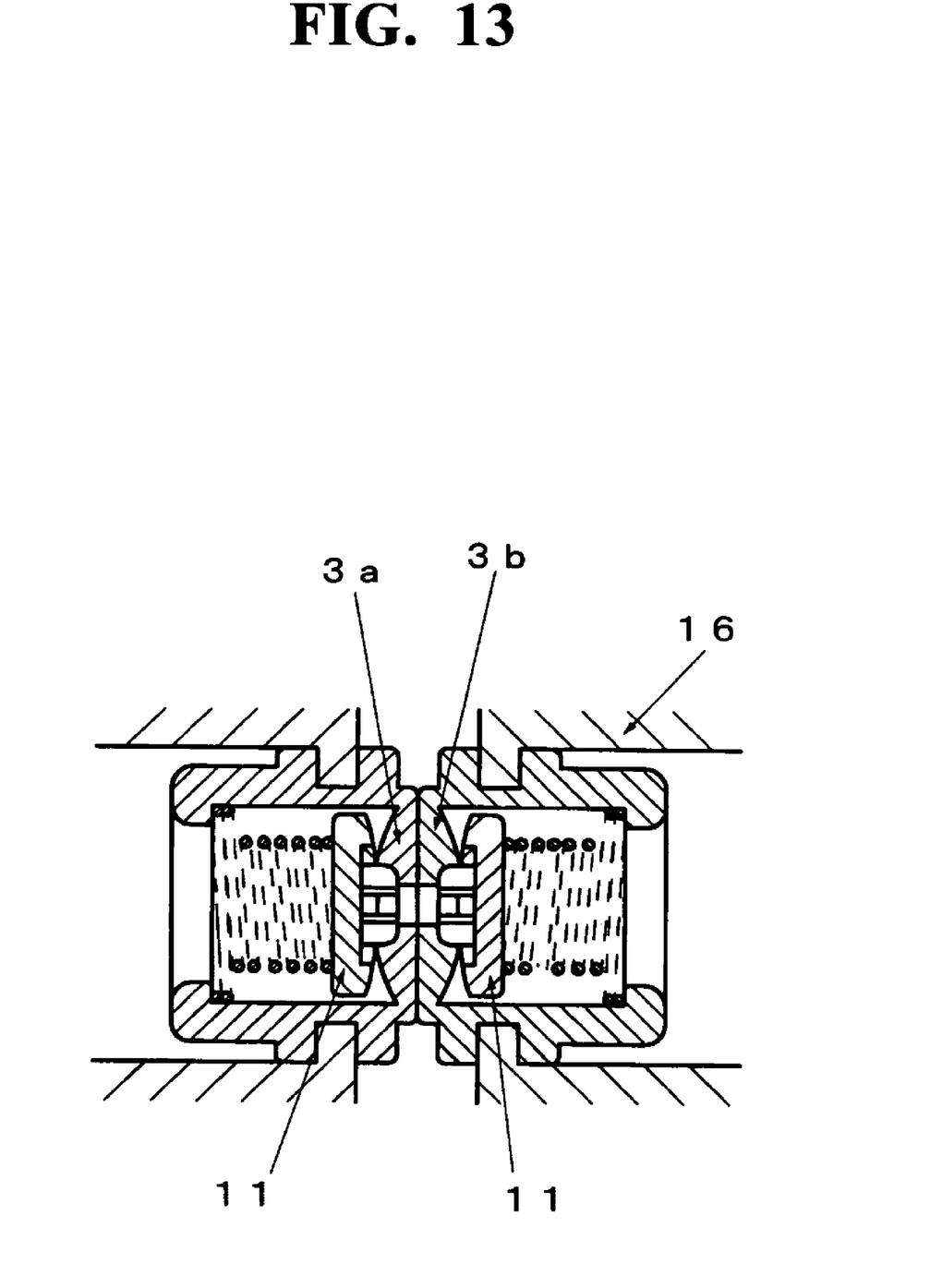
FIG. 13 illustrates the joint process at the post-joint stage (the step after joining two parts).

FIGS. 4 to 6 show an elastic member 3a of the joint device which is applied to the liquid reservoir 1 or the liquid acceptor 4. FIGS. 7 through 10 show a valve 11. FIG. 11 shows the joint device where the elastic member 3a or 3b is combined with the valve 11. FIGS. 12 and 13 show the joint process according to this embodiment.

The elastic member 3a or 3b (the only difference between the elastic members 3a and 3b is the positions of labyrinth seals 7a and 7b) should only have a hole 6 which can fit in or engage with the valve 11 on the other side of its joint surface, that is, on the inside surface where the elastic member 3a or 3b is attached to the liquid reservoir 1 or the liquid acceptor 4. Moreover, the elastic member 3a or 3b may be made of any material as long as it is capable of elastic deformation.

Regarding the material of the elastic member 3a or 3b, various kinds of known elastic materials, such as various types of rubber and elastomers, can be used. Specific examples of the material include: styrene butadiene rubber, butadiene rubber, syndiotactic 1,2-polybutadiene, isoprene rubber, acrylonitrile-butadiene rubber, chloroprene rubber, ethylene-propylene rubber, ethylene-propylene terpolymer, butyl rubber, acrylic rubber, chlorosulfonated polyethylene, silicon rubber, vinylidene fluoride rubber, tetrafluoroethylene-propylene rubber, tetrafluoroethylene perfluoromethyl vinyl ether rubber, fluorosilicon rubber, epichlorohydrin rubber, polysulfide rubber, urethane rubber, and natural rubber. One of these rubber types or a combination of two or more types may be used. It is desirable to select the material of the elastic member 3a or 3b according to the properties of the liquid to be sent or received, and according to the properties of the elastic member 3a or 3b such as sliding property, permanent compressive strain property, rebound resilience, and elution resistance. Regarding this embodiment, because the elastic member 3a or 3b is to be used in the DMFC, ethylene-propylene rubber which has excellent methanol resistance and permanent compressive strain property is selected.

As shown in FIGS. 4 to 6, the elastic member 3a or 3b of this embodiment is structured to have the hole 6. According to this embodiment, its joint surface is curved outwards and raised, while the other side of the joint surface (that is, the inside surface) is embayed and sunken. This makes the deformation of the elastic member 3a or 3b in the joint direction easier. The elastic member 3a or 3b should at least have the hole 6. The structure of the elastic member 3a or 3b is not limited to the structure of the joint surface which is curved outwards and raised and to the structure of the embayed and sunken inside surface that is the back side of the joint surface. Both sides may be flat, or the joint surface may be embayed and sunken and the inside surface may be curved outwards and raised.

A convex labyrinth seal 7a is provided on the joint surface. Any structure of the labyrinth seal 7a may be applied as long as it is shaped to protrude from the joint surface and is placed around the hole 6. Regarding this embodiment, a cross section of the protruding part of the labyrinth seal 7a is in a semicircular shape. However, its sectional shape is not particularly limited to the semicircular shape, and may be an inverted V or a quadrangle. The same applies to the labyrinth seal described hereinafter. The only difference between the elastic members 3a and 3b is the positions of the labyrinth seals 7a and 7b. This makes it possible to prevent liquid leaking between the joint surfaces at the time of joining the elastic members 3a and 3b, thereby achieving high reliability. However, at the time of joining the joint surfaces, since a contact pressure between the joint surfaces is high, and since adhesion between the elastic member and the material of the opposite member is high, it is not always necessary to provide the labyrinth seal 7a or 7b. The labyrinth seal 7a or 7b can be designed according to the coupling conditions and the material of the elastic member 3a or 3b, and depending on the state of liquid leakage.

The elastic member of this embodiment is provided with ribs 8 for the attachment to the liquid reservoir 1 or the liquid acceptor 4. The ribs 8 may be attached to the liquid reservoir 1 or the liquid acceptor 4 in any way as long as they would not cause liquid leakage. Moreover, in order to prevent liquid leaking from the attached parts, the elastic member 3a or 3b and the liquid reservoir 1 or the liquid acceptor 4 may be integrally formed into a housing by means of insert molding or coinjection molding.

Furthermore, an urging element is used to cause the valve 11 to be pressed against the elastic member 3a or 3b in order to enhance reliability with regard to liquid leaking from the section where the valve 11 contacts the elastic member 3a or 3b. Accordingly, a seat 9 of a spring 10 which is the urging means for the elastic member 3a or 3b is provided in the elastic member 3a or 3b of this embodiment. However, when the urging means is employed, and if the spring seat 9 is provided on the housing of the liquid reservoir 1 or the liquid acceptor 4, it is not always necessary to provide the spring seat 9 on the elastic member 3a or 3b.

The material and shape of the valve 11 is not limited as long as the valve 11 can fit in or engage with the hole 6 of the elastic member 3a or 3b, and has a flow path for the liquid, and is made into the shape and of the material that enables it to contact the elastic member 3a or 3b. Examples of the material of the valve 11 include metals, plastics, wood, and ceramics. Among them, metals and plastics are preferable.

Specific examples of metals include: stainless steel, aluminum, iron, copper, silver, platinum, and gold. Specific examples of plastics include: polyethylene, polypropylene, polyvinyl chloride resin, polystyrene, ABS resin, methacrylic resin, polyethyleneterephthalate, polyamide, polycarbonate, polyacetal, polybutylene terephthalate, modified polyphenylene ether, polyphenylene sulfide, liquid crystal polymer, polysulfone, polyether sulfone, polyallylate, polyether ether ketone, polyphthal amide, polyimide, polyetherimide, polyamide-imide, polymethyl pentene, fluororesin, polyvinylidene fluoride, TEFE, PFA, phenolic resin, urea resin, melamine resin, unsaturated polyester, diallyl phthalate, epoxy resin, polyurethane resin, and silicon resin. Regarding this embodiment, polypropylene which is highly resistant to methanol is used for both the elastic members 3a and 3b, in consideration of the fact that it is used in the DMFC.

As shown in FIGS. 7 to 10, the valve 11 of this embodiment has a partially convex structure. This convex part fits in or engages with the hole 6 of the elastic member 3a or 3b. When it fits in or engages with the hole 6, it may be fixed, bonded, mounted, or inserted. Regarding this embodiment, the convex part has a notch 13, and the surface of the valve 11 which contacts the elastic member 3a or 3b has a groove 12. The notch 13 and the groove 12 form a flow path of the liquid when the valve 11 opens. Moreover, the surface of the valve 11 which contacts the elastic member 3a or 3b is curved and raised in order to enhance adhesion with the embayed and sunken inside surface of the elastic member 3a or 3b. Furthermore, concerning this embodiment, just like the labyrinth seals 7a and 7b provided to prevent the liquid leaking from the joint surfaces, a labyrinth seal 17 is also provided on the surface of the valve 11 in contact with the elastic member 3a or 3b in order to prevent the liquid leakage when the valve 11 is open.

As shown in FIG. 11, the joint device in which the elastic member 3a or 3b is combined with the valve 11 is attached to the liquid reservoir 1 or the liquid acceptor 4, using the ribs 8 of the joint device. Concerning the valve 11, its convex part engages with the hole 6 on the other side of the joint surface, the inside surface, of the elastic member 3a or 3b. Regarding this embodiment, the compression ring 10 is used as the urging means to cause the valve 11 to be pressed against the elastic member 3a or 3b. The section where the elastic member 3a or 3b contacts the valve 11 prevents the contained liquid from flowing out. Although the compression spring 10 is used as the urging means in this embodiment, any known urging means can be use as long as it urges the valve 11 to be pressed against the elastic member 3a or 3b.

As shown in FIG. 13, as the joint surfaces of the elastic member 3a and 3b are made to contact each other, the elastic members 3a and 3b deform, the valve 11 is no longer in contact with the elastic member 3a or 3b, and the contact area no longer exists. The liquid then flows through the gap obtained above and through the notch 13 and the groove 12.

When the joint parts are moved away from each other, the elastic members 3a and 3b respectively restore to their original state before they are joined, and the valve 11 comes in contact with the elastic member 3a or 3b and the valve 11 closes. Accordingly, it is possible to seal in the contained liquid.

When the flow rate of the liquid flowing from the liquid reservoir 1 to the liquid acceptor 4 was examined in the state of FIG. 13 where the internal pressure of the liquid reservoir was 5 kPa and the inside of the liquid acceptor 4 was placed under atmospheric pressure, the flow rate was 50 ml/hr. When the DMFC was activated in this state, an output of 30 mW was obtained.

When the liquid reservoir 1 in the state of FIG. 13 was removed from the liquid acceptor 14, no liquid leaked from either the liquid reservoir 1 or the liquid acceptor 4. Liquid leakage was examined by increasing the internal pressure of the liquid reservoir 1 and the liquid acceptor 4 from 1 kPa to 1 MPa, and no liquid leakage was observed in this range of pressure changes.

As described above, the liquid sending and receiving joint device of this invention performs well as it is capable of sending the liquid without any liquid leaking under any circumstances. Moreover, regarding the above-described embodiment, the volume of the elastic member packing is 225 mm$^3$. As compared to conventional liquid sending and receiving joint devices, the joint device of this invention can be downsized. Therefore, it is possible to apply this invention hereafter as a liquid sending and receiving joint device to portable electronic equipment which uses the DMFC as an energy source.

We claim:

1. A liquid sending and receiving joint device connecting a liquid reservoir for containing a liquid to a liquid acceptor connected to the liquid reservoir to receive the liquid from the liquid reservoir;
    wherein an elastic member having at least a hole and a valve with a flow pat is provided at a joint part of either the liquid reservoir or the liquid acceptor, or both of them, and the valve fits in or engages with the hole;
    wherein a contact surface of the elastic member in contact with the valve has a curved and concave structure.

2. The liquid sending and receiving joint device according to claim 1, wherein deformation of the elastic member causes the valve to open or close, thereby forming the flow path.

3. The liquid sending and receiving joint device according to claim 1, wherein a joint surface of the elastic member has a curved and convex structure.

4. The liquid sending and receiving joint device according to claim 1, wherein an urging element is used to press the valve against the elastic member.

5. The liquid sending and receiVing joint device according to claim 1, wherein a joint surface of the elastic member has a labyrinth seal.

6. The liquid sending and receiving joint device according to claim 1, wherein at the joint surface of the elastic member and the valve, either the elastic member or the valve, or both of them, have a labyrinth seal.

7. The liquid sending and receiving joint device according to claim 1, wherein the liquid acceptor is a fuel cell which generates electric power by using liquids as a fuel, and the liquid reservoir is a liquid fuel cartridge.

8. The liquid sending and receiving joint device according to claim 7, wherein a liquid containing at least methanol is used as fuel for the fuel cell.

9. The liquid sending and receiving joint device according to claim 1;
    wherein deformation of the elastic member causes the valve to open or close, thereby forming the flow path; and
    wherein a joint surface of the elastic member has a curved and convex structure.

* * * * *